United States Patent [19]

Pruden et al.

[11] 4,424,977

[45] Jan. 10, 1984

[54] WEDGE CHUCK

[75] Inventors: Samuel H. Pruden, East Hartford; James B. Kunz, New Haven, both of Conn.

[73] Assignee: Cushman Industries, Incorporated, Hartford, Conn.

[21] Appl. No.: 362,511

[22] Filed: Mar. 26, 1982

[51] Int. Cl.³ .............................................. B23B 31/16
[52] U.S. Cl. ......................................... 279/121; 279/4
[58] Field of Search ....................... 279/2,4,121,110,60

[56] References Cited

U.S. PATENT DOCUMENTS

| 3,727,929 | 4/1973 | Fink | 279/110 X |
| 4,026,566 | 5/1977 | Röhm | 279/121 |
| 4,249,459 | 2/1981 | Pruden | 279/4 X |
| 4,275,892 | 6/1981 | Röhm | 279/121 X |

FOREIGN PATENT DOCUMENTS 2541976 3/1977 Fed. Rep. of Germany ...... 279/110
1107731 6/1954 France ................................ 279/121

Primary Examiner—William R. Briggs
Assistant Examiner—Glenn Webb
Attorney, Agent, or Firm—Walter Spruegel

[57] ABSTRACT

Wedge chuck having grooves in the sides of each jaw and in the adjacent sides of its way in the chuck body, of which the grooves in all jaws form a given angle with a common plane normal to the chuck axis in which all jaws move, and the grooves in each way lie in a plane normal to the common plane and to the median plane of the associated way in which the chuck axis lies, and a jaw actuator guided in the chuck body for movement in the direction of the chuck axis and carrying sets of follower keys of which the keys of each set are received with a sliding fit in the grooves in a jaw and in the grooves in the associated way, whereby on back and forth movement of the actuator the grooves and follower keys cooperate to move the jaws to and from the chuck axis.

8 Claims, 8 Drawing Figures

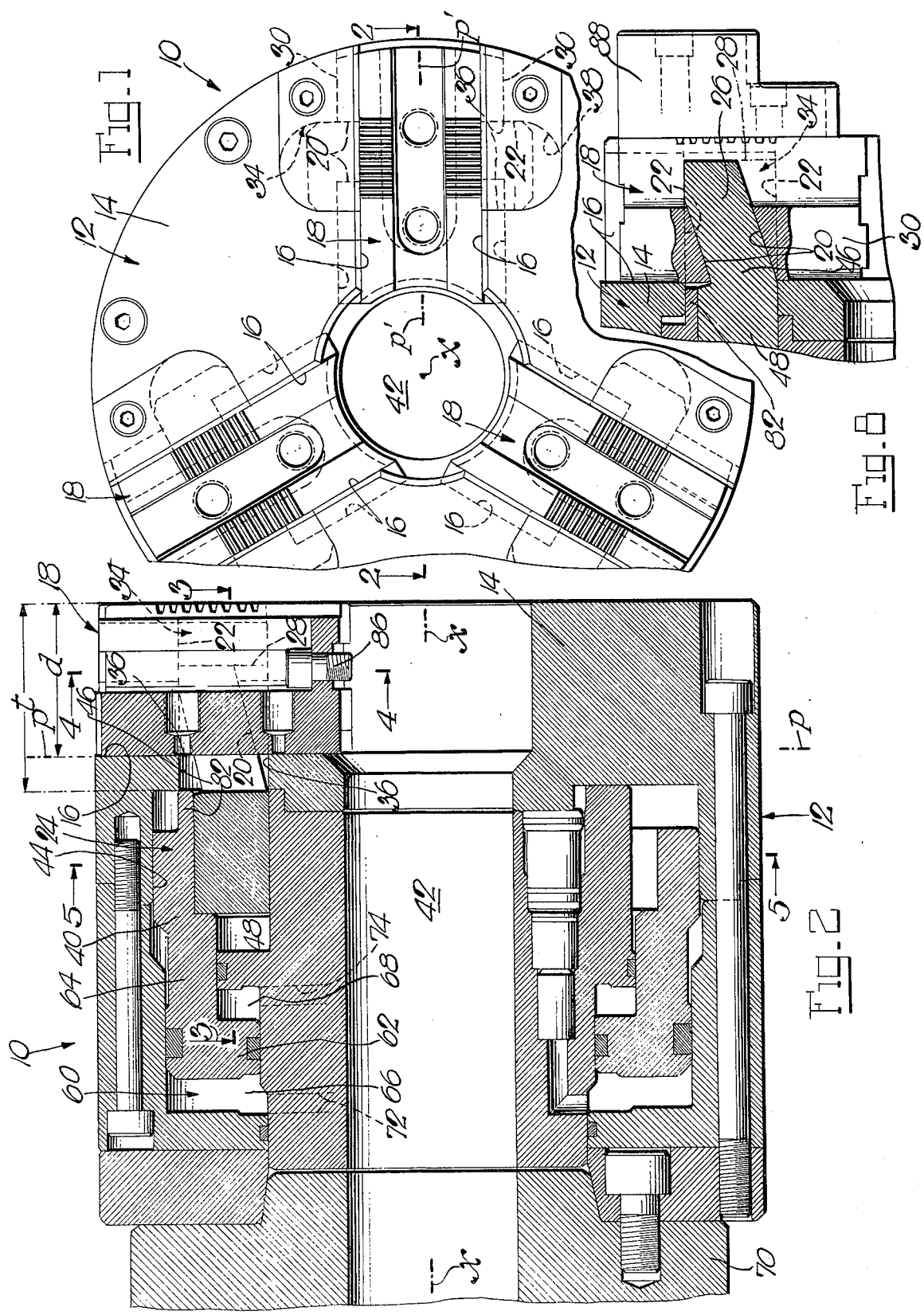

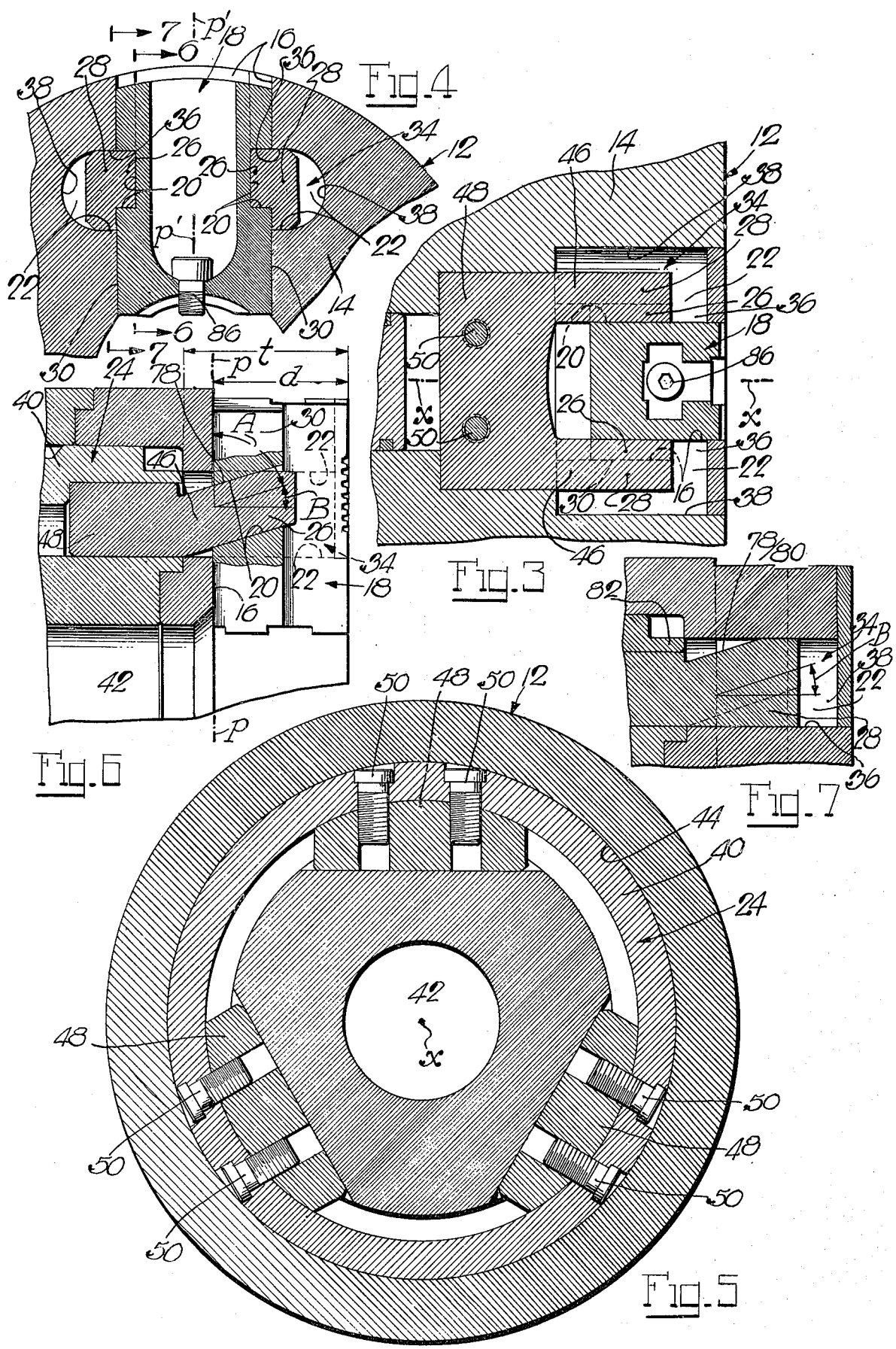

WEDGE CHUCK

This invention relates to chucks in general, and to chucks of wedge-type in particular.

Chucks of this type, while generally satisfactory, afford far less than full satisfaction in a few, though quite important, respects. Thus, it is operational friction of the jaws in particular which concerns these chucks. In this connection, operational friction of considerable magnitude is, of course, inherent in the wedge action involved, but such friction is aggravated quite considerably by the customary formation of the wedges as T-slots in a common centerpiece which receive keys at the inner ends of the jaws with a slide fit. Thus, to machine the T-slots in the centerpiece and the key formations on the inner jaw ends, and assemble them, without incurring binding tendencies or just undue tightness in their action, is a rather difficult task in any event, and leaves operational friction in these chucks on the average relatively high. Moreover, the formation with reasonable precision of the T-slots in the centerpiece and key formations on the jaws and their adequate fit on assembly, entails rather high cost which does not contribute toward greater attractiveness of these chucks. There is also this further point that the arrangement of these chucks for their performance with through-holes is at the sacrifice of condensed diametric construction of these chucks, since not only the jaws but also the wedges and their operating means must be located outside the confines of the through-holes. Also, since the wedges in these chucks are arranged at the inner ends of the jaws, the chucks are also without releasable gripping pads because there is no room on the inner jaw ends for releasable mounting means for such pads.

It is a primary object of the present invention to provide a wedge chuck for performance of the jaws without any binding tendencies of the same and at considerably less operational friction than was possible heretofore.

It is another important object of the present invention to provide a wedge chuck which in its wedge action lacks any T-slot formations and, instead, relies on straight cam grooves of uniform width and rectangular section, and follower keys of plain bar form which cooperate with the grooves. To this end, the grooves are of two kinds, of which those of a first kind are provided in the opposite sides of each jaw in lateral alignment with each other and in lengthwise disposition to form a given angle with a common plane normal to the chuck axis in which all jaws are guided for movement in their ways in the chuck body, while the grooves of a second kind are associated with each way and provided in the opposite sides thereof and, hence, in the chuck body, and they lie in a plane normal to the common plane and to the median plane of the associated way in which the chuck axis lies, and there is further provided a jaw actuator which is guided in the chuck body for movement in the direction of the chuck axis and carries the follower keys for movement therewith, with the keys being also of two kinds and received with a slide fit in the grooves of the associated kinds, whereby on back and forth movement of the actuator the grooves and keys cooperate to move the jaws to and from the chuck axis and counteract jaw-binding forces. Thus, the formation of the grooves in the jaws involves no more than a simple machine operation which, moreover, can be kept at high precision. The formation of the other grooves in the chuck body can be kept equally simple and precise by machining in the front wall of the chuck body in association with each way therein an aperture which intersects the associated way and has opposite sidewalls and endwalls, of which the sidewalls lie in parallel planes normal to the common plane and to the median plane of the associated way, and the endwalls are spaced outwardly from the sides of this way, whereby the aperture on opposite sides of the jaw therein forms these other grooves in the chuck body. In thus forming the other grooves, they also extend across the entire thickness of the front wall of the chuck body and thereby afford not only ready access of the follower keys to the respective grooves from behind the front wall, but also adequate length of the other grooves for optimum guidance of the follower keys therein over the operating range of the jaw actuator. Precise formation of the follower keys on the jaw actuator also involves no more than simple machining, considering that they are in form like plain bar stock. Also, the grooves and follower keys readily lend themselves to highly precise slide as well as form interfit in the assembly of the chuck, so that these operating parts together with the jaws have virtually no operational play and perform smoothly at minimal operational friction.

While the present chuck is exceptionally advantageous in that its featured wedge action not only obviates any binding tendencies of the jaws, but also keeps operational friction well below the minimum friction of prior wedge chucks, the present chuck is still further advantageous in that its cost is well below that of prior wedge chucks which is due to the radical design and structural simplicity of the wedge action with its featured operating cam grooves and follower keys.

The featured wedge action in the present chuck, by having been transferred from within the inner ends of the jaws to intermediate their outer and inner ends, is further advantageous by heavily contributing toward optimum diametrically condensed wedge chuck constructions in any event, and regardless of whether or not the chucks require through-holes. Also, by having the wedge action in the present chuck transferred from within the inner ends of master jaws to intermediate their outer and inner ends, the inner ends of these jaws are clear for releasable mounting of work-gripping pads thereon, if desired, with conventional top jaws being also releasably mountable on the master jaws as usual.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary front view of a wedge chuck embodying the invention;

FIG. 2 is a longitudinal section through the same chuck taken substantially on the line 2—2 of FIG. 1;

FIGS. 3 and 4 are fragmentary sections through the chuck taken substantially on the lines 3—3 and 4—4, respectively, of FIG. 2;

FIG. 5 is a cross-section through the chuck along the line 5—5 of FIG. 2;

FIGS. 6 and 7 are fragmentary sections through the chuck taken substantially on the lines 6—6 and 7—7, respectively, of FIG. 4; and FIG. 8 is a fragmentary section through the chuck similar to FIG. 7 but showing prominent acting parts of the chuck in a different operating position.

Referring to the drawings, and more particularly to FIGS. 1 to 5 thereof, the reference numeral 10 designates a chuck of wedge type having a rotary axis x and a body 12 with a front wall 14 in which are provided ways 16 for jaws 18 for their guidance for movement radially of the axis x and in a common plane p which extends normal to the axis x.

Of prime importance in this chuck is its wedge action which features straight cam grooves 20 and 22 in the jaws 18 and in their ways 16, respectively, and a jaw actuator 24 with follower keys 26 and 28 which cooperate with the respective cam grooves 20 and 22. The grooves 20 are straight and of simple rectangular section and uniform width and they are machined into the opposite sidewalls 30 of each jaw in lateral alignment with each other, with the grooves 20 in each jaw forming a given angle A with the common plane p so that these grooves have a wedge angle B which in this instance is 90° minus A (FIG. 6). The other grooves 22 in the ways 16 are also straight and of simple rectangular section and uniform width, but they are longer than grooves 20 in the jaws 18 and in this instance extend lengthwise across the full thickness t of the front wall 14 of the chuck body and, hence, rearwardly beyond the depth d of the ways 16 for access of the keys 26 and 28 to the respective grooves 20 and 22 from behind the front wall 14 (FIGS. 2 and 6).

To the end of thus forming the grooves 22 in the front wall 14 of the chuck body across its full thickness, recourse is had to apertures 34 which are provided, and more especially machined, in this front wall in association with the ways 16, with each aperture 34 intersecting the associated way 16 intermediate its outer and inner ends and providing opposite sidewalls 36 and opposite endwalls 38, of which the sidewalls 36 lie in spaced parallel planes normal to the common plane p and to the median plane p' of the associated way in which the chuck axis x lies (FIGS. 1 and 4). Thus, with the endwalls 38 of each aperture 34 being equally spaced outwardly from the sides 30 of the jaw 18 in the associated way 16, the opposite ends of the aperture on the opposite sides of the jaw form the grooves 22 in the associated way, as will be readily understood.

The jaw actuator 24 has a central part 40 which is guided in the chuck body 12 for movement in the direction of the axis x. With the chuck having in this instance a through-hole 42, the actuator part 40 is ring-shaped about this through-hole and is received with a sliding fit on a cylindrical wall 44 in the chuck body (FIGS. 2 and 5). The keys 26 and 28 of the jaw actuator 24 are provided on spaced prongs 46 of separate fork pieces 48 which are carried by the actuator part 40 by being screwed thereto as at 50, with the keys 26 and 28 on each fork piece 48 being associated with a way 16 and the jaw 18 therein. Thus, the prongs 46 of each fork piece 48 of the jaw actuator 24 project forwardly into the grooves 22 in the associated way 16 and straddle the jaw 18 therein (FIG. 3). Endlengths of these prongs are formed, by accurate machining, into the key formations 26 and 28, of which the "inner" key formations 26 are laterally aligned and face each other, and the other or "outer" key formations 28 are also laterally aligned and provided on the outside of the inner key formations 26, with the inner and outer keys 26 and 28 of each pair being thus formed in one piece. The keys 26 and 28 of each pair are received in the respective grooves 20 and 22 with a slide fit, and they are lengthwise also in form-fit with these grooves. Further, the keys 26 and 28 of each pair extend lengthwise at the wedge angle B between them (FIG. 7).

The jaw actuator 24 is moved back and forth for operating the jaws 18. Thus, let it be assumed that the jaws 18 are to be moved inwardly to grip work and outwardly to release work, the jaw actuator 24 will in that case be moved to the right in FIG. 2 for gripping work, and will be moved in the opposite direction to release work. The present chuck is in this instance self-contained by providing in the chuck body 12 a cylinder 60 with a piston 62 therein which powers the jaw actuator 24 through intermediation of a rod 64. The cylinder 60 and piston 62 as well as the piston rod 64 are in this instance ring-shaped about the through-hole 42, with the piston 62 dividing the cylinder 60 into exemplary chuck-closing and chuck-opening cylinder ends 66 and 68. The piston rod 64 serves in this instance also as the part 40 of the jaw actuator 24 (FIG. 2). For operation of the chuck, the same is mounted in usual manner on a power spindle 70 of a machine tool such as a lathe, for instance.

For operation of the jaws, operating fluid, such as hydraulic fluid, for instance, is passed to and from the cylinder ends 66 and 68 through suitable ports 72 and 74 in the chuck body (FIG. 2). These ports 72 and 74 are in communication with control valves through suitable passages in the chuck body and conduits outside thereof which are not shown because they form no part of the present invention. These valves may be manipulated by an operator, to admit operating fluid to the chuck-closing cylinder end 66 and simultaneously vent the other cylinder end 68 for chuck closure, or to admit operating fluid to the chuck-opening cylinder end 68 and simultaneously vent the other cylinder end 66 for chuck opening.

The grooves 20 and 22 in the jaws 18 and ways 16 and the respective keys 26 and 28 are of considerable lengths for their playless and low-friction cooperation in all jaw positions. In this connection, the lengths of these grooves 20 and 22 and coordinated keys 26 and 28 are preferably such that the keys 26 fully extend in their respective grooves 20 over the entire lengths of the latter when the jaws are in any of their work-gripping positions within a given range, and the other keys 28 extend in their respective grooves 22 to both sides of the adjacent groove 20 in the nearest jaw 18 also when the jaws are in any of their work-gripping positions within the same range. Thus, and by way of example, the keys 26 and 28 extend in their respective grooves as just explained in all work-gripping positions of the jaws within an exemplary range in which the keys extend between the intermediate and extreme positions in FIGS. 6 and 8. This holds true even though the sides 78 of the keys 28 have, for the sake of simple machining, been cut away into coplanar disposition with the slanting sides 80 of their coordinated keys 26 (FIG. 7), for in all positions of the keys and grooves between their positions in FIGS. 6 and 8 skirt formations 82 on the part 40 of the jaw actuator 24 are received with a sliding fit in the adjacent ends of the associated apertures 34 (FIG. 8) and thus augment the keys 28 in the grooves 22.

The straight "wedge" grooves 20 of simple rectangular section and uniform width are easily machined in the sides of the jaws 18 in accurate coordination with each other, and the straight companion grooves 22 are as easily and accurately machined in the sides of the ways 16 by simply machining the apertures 34 in the front wall 14 of the chuck body 12. Further, the coordinated keys 26 and 28, by being of plain bar shape and formed in one piece, are as easily machined with high precision at the ends of the prongs 46 of the jaw actuator 24. Thus, the "operating" parts 20,22,26 and 28 of the wedge action lend themselves not only to simple machining with high precision, but also to their playless and precise interfit, with the result that the jaws have no binding tendencies and only a minimum of operational friction. Also, contributing to non-binding operation of the jaws at a minimum of operational friction is the location of the active parts of the wedge action on opposite sides of the jaws, so that each jaw rests like a cradle between these parts of the wedge action.

The featured wedge action of the present chuck, by being located intermediate the outer and inner ends of the ways in the chuck body, also lends itself to condensed diametric construction of the chuck, and this holds true even when the chuck has a through-hole as in this instance. Further, with the wedge action located intermediate the outer and inner ends of the ways in the chuck body, the present wedge chuck also lends itself to operation with gripping pads (not shown). To this end, the jaws 18 are master jaws on the inner ends of which may be provided releasable mounting means for gripping pads in the usual form of screws 86, while conventional top jaws 88 may be provided on the master jaws 18 (FIG. 8).

What is claimed is:

1. A chuck having jaws, a body with a rotary axis having a front wall with ways therein associated with said jaws and guiding them for movement radially of, and in a common plane normal to, said axis, with each way having a median plane in which said axis lies, and each way and jaw therein having opposite sidewalls lying in planes parallel to and equally spaced from said median plane of the way, of which said sidewalls of each jaw have therein laterally aligned first grooves of the same width and extending lengthwise to form a given angle with said common plane, and said sidewalls of each way have therein laterally aligned second grooves of uniform width and with opposite sides lying in parallel planes normal to said common plane and to said median plane of the associated way, and a jaw actuator guided in said body for movement in the direction of said axis and having a set of keys associated with each jaw, of which the keys of each set are received with a sliding fit in said first grooves in the associated jaw and with a sliding fit in said second grooves in the associated way, respectively, whereby on back and forth movement of said actuator said grooves and keys cooperate in moving said jaws to and from said axis.

2. A chuck having jaws, a body with a rotary axis having a front wall with a front face and ways therein associated with said jaws and guiding them for movement radially of, and in a common plane normal to, said axis, with each way having inner and outer ends and a median plane in which said axis lies, and each jaw having opposite sidewalls lying in planes parallel to and equally spaced from said median plane of the associated way and having therein laterally aligned first grooves of the same width between their sides and extending lengthwise to form a given angle with said common plane, identical apertures in said wall associated with said ways, of which each aperture intersects the associated way intermediate its ends and has opposite sidewalls and opposite endwalls, of which said sidewalls lie in parallel planes normal to said common plane and to said median plane of the associated way, and said endwalls are spaced outwardly from said sidewalls of the jaw in the associated way so that each aperture forms on opposite sides of the jaw in the associated way second grooves the sides of which are formed by said sidewalls of the aperture, and a jaw actuator guided in said body for movement in the direction of said axis and including a pair of spaced prongs associated with each aperture and extending thereinto, with the prongs of each pair having first and second key formations received with a sliding fit in said first grooves of the associated jaw and with a sliding fit in said second grooves in the associated aperture, respectively, whereby on back and forth movement of said actuator said grooves and key formations cooperate in moving said jaws to and from said axis.

3. A chuck as in claim 2, in which said first and second key formations are in form fit with said sides of said first and second grooves, respectively.

4. A chuck as in claim 3, in which said jaws have a range of work-gripping positions, said front wall has also a backface, said sidewalls of the jaws are spaced rearwardly from said front face and forwardly from said backface of said front wall, and said second key formations extend in said second grooves in front and rear of said sidewalls of the associated jaws in all work-gripping positions of the latter within said range.

5. A chuck as in claim 4, in which said first key formations extend in said first grooves throughout their lengths in all work-gripping positions of said jaws within said range.

6. A chuck as in claim 2, in which said jaws are master jaws with inner and outer ends, and there are further provided releasable mounting means for top jaws on said master jaws, and releasable mounting means for work-gripping pads on said master jaws.

7. A chuck as in claim 2, in which said body has a through-hole about said axis, and said actuator has a part which carries said prongs and is ring-shaped about said through-hole.

8. A chuck as in claim 2, in which said body has a through-hole about said axis, and there are further provided in said body a fluid cylinder and a piston therein with a piston rod of which said cylinder, piston and rod are ring-shaped about said through-hole, and said piston rod is said actuator part.

* * * * *